United States Patent Office 3,048,456
Patented Aug. 7, 1962

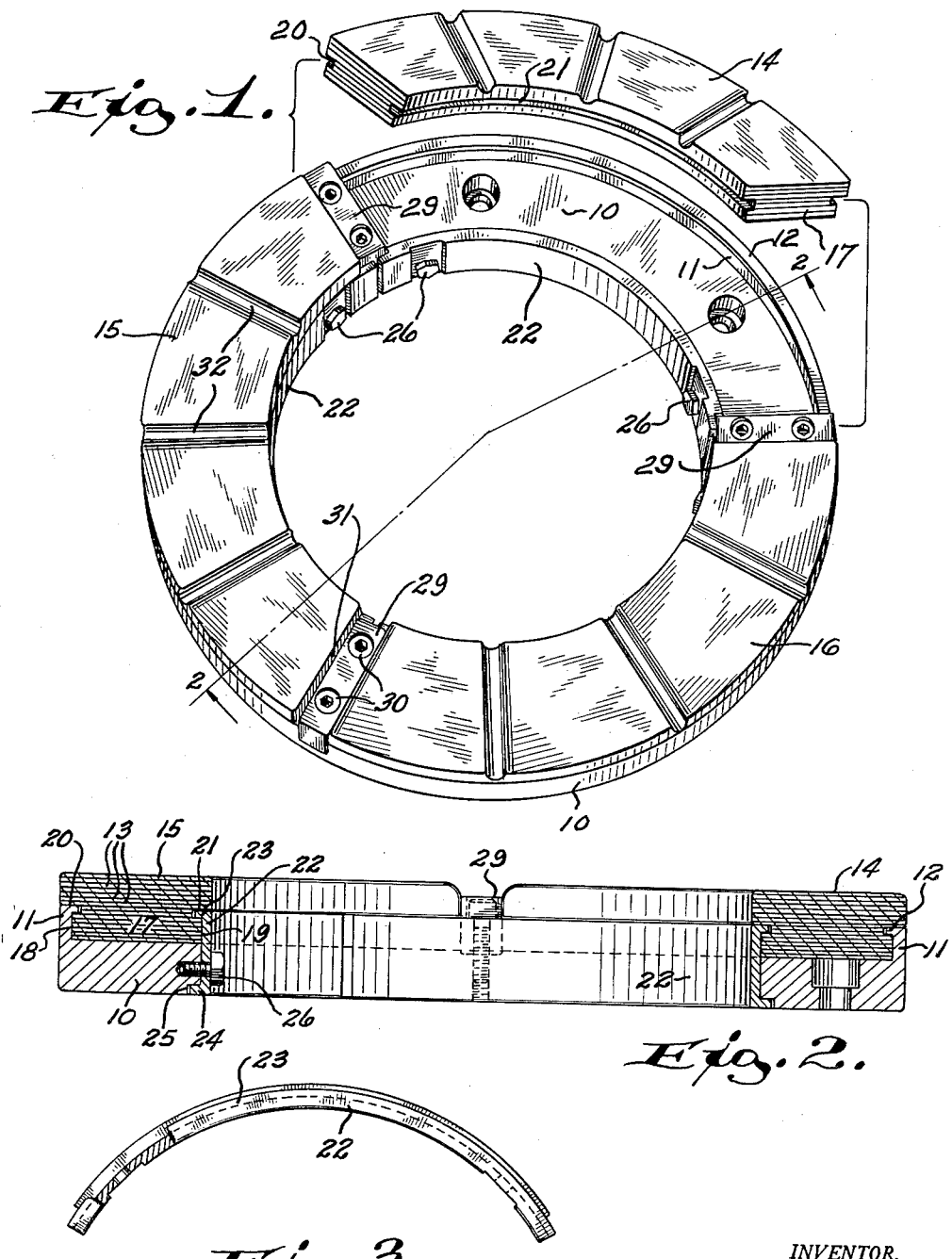

3,048,456
WATER LUBRICATED THRUST BEARINGS
Jerome M. Gruber, Waukesha, Wis., assignor to Waukesha Bearings Corporation, Waukesha, Wis., a corporation of Wisconsin
Filed Nov. 15, 1960, Ser. No. 69,502
5 Claims. (Cl. 308—160)

This invention relates to improvements in water lubricated thrust bearings.

For certain types of uses such as under water propulsion, water lubricated bearings are employed, the water in which a boat is supported running in and out of the bearing to do the lubricating. Where a bearing is to be water lubricated, it is desirable to use a suitable plastic or other non-metallic material for the wearing surface.

It is a general object of the present invention to provide a water lubricated thrust bearing, of the flat or tapered land construction, which is so designed as to provide a relatively inexpensive assembly arrangement, and wherein the phenolic pad which forms the wear surface is so constructed in conjunction with the base ring as to facilitate assembly. If a circular wear surface of phenolic material is made in one piece or in two semi-circular pieces, installation of the pieces and suitable anchoring of the latter in place presents substantial problems.

It is a more specific object of the present invention to provide a thrust bearing as above described wherein the phenolic pad is constructed of at least three sections which cooperate in assembly to form a circle, there being a novel pad retainer band construction and novel pad section separators which cooperate to permit easy assembly and to firmly anchor the parts in assembled position.

With the above and other objects in view, the invention consists of the improved water lubricated thrust bearing, and all of its parts and combinations, as set forth in the claims, and all equivalents thereof. In the accompanying drawing, illustrating one complete embodiment of a preferred form of the invention, in which the same reference numerals designate the same parts in all of the views:

FIG. 1 is a perspective view of one of the improved thrust bearings showing one of the phenolic pad sections in removed position to expose the cooperating parts;

FIG. 2 is a cross sectional view of a fully assembled thrust bearing taken approximately on the line 2—2 of FIG. 1; and FIG. 3 is a top view of one of the pad retainer band sections, part being broken away and shown in section.

Referring more particularly to the drawing, the numeral 10 designates a base ring of metal or other suitable material having an upstanding outer peripheral rim 11 with an inturned circular flange 12 forming a circular tongue.

The pad proper is preferably formed of phenolic material such as "Micarta" or "Textilite" or other suitable plastic material. It is preferably formed of superimposed laminae 13 as shown in FIG. 2. For the purpose of the present invention the pad is made of three arcuate sections 14, 15 and 16. More than three sections may be used but it is desirable to use as few sections as necessary. Each of the three sections is adapted to extend for a little less than 120 degrees of a circle as is clear from FIG. 1, where one of the arcuate sections is shown separated.

Referring to the cross section of one of the pad sections, the lower portion is of reduced width as at 17 to provide an external lower circular recess portion 18 and an internal circular recess portion 19. At the top of each recess 18 is a circular groove 20 and at the top of the internal circular recess 19 is a circular groove 21. The outer recess 18 is adapted to receive the upstanding rim portion 11 of the base ring with the circular tongue 12 of the rim portion interlocking with the circular groove 20 as shown in FIG. 2. The three pad sections 14, 15 and 16 may be assembled by being moved from the inside out to bring the recesses 18 and grooves 20 into engagement with the outer rim 11 and with its circular tongue 12.

After such preliminary positioning of the pad sections, three pad retainer band sections 22, each of which is as shown in FIG. 3, are inserted in position as in FIG. 1. While the use of three band sections is preferred, two or more may be used. The bands have upper tongues 23 for cooperation with the internal grooves 21 of the pads and lower tongues 24 for cooperation with a circular recess 25 at the bottom of the base ring 10. The retainer bands are held in position by screws 26 which fit in recesses in the bands as illustrated.

After the shoes have been thus assembled, the pad separators 29 are fitted in between the pad sections 14, 15 and 16, as shown in FIG. 1 and are held in position by screws 30. It is preferred to use three separators, but one or more can be employed as long as the total separator space provides enough leeway for assembly of the pad sections from inside out. The arrangement is such that after assembly there is .90 of an inch clearance at 31 between one end of a pad section and the adjacent separator 29 when the other end of the pad section is in abutment with the next separator. The separators 29 are merely rectangular blocks of metal as shown in FIGS. 1 and 2.

With the above arrangement it is possible to quickly assemble phenolic pad sections on a metal base ring from the inside out, the spaces which are later filled by the separators allowing enough leeway to permit insertion of the last section before the separators 29 are installed. The three piece pad retainer band may be quickly assembled to thoroughly anchor the pad sections in position, and the installation of the separator pieces 29 provides for proper clearance. With the present invention it is possible to form the pads in as few as three sections making for a relatively inexpensive assembly operation and involving the use of as few pieces as can be designed to do the work. The radial grooves 32 on top of the pads allow for better distribution of the water during use.

It is to be understood that the present invention is not to be limited to the exact details of construction shown and described for obvious modifications will occur to persons skilled in the art.

What I claim is:

1. In a thrust bearing, a base ring having an upstanding permanent external peripheral rim with an inwardly projecting circular tongue, at least three arcuate pad sections having a total circumferential length of somewhat less than 360 degrees positioned on top of said base ring and each having a lower portion of decreased width in cross section and each having an external peripheral groove above said portion of decreased width which interlockingly receives the circular tongue of the base ring rim, which rim fits against the pad portions of decreased width and provides a substantially flush outer periphery for the bearing, and each pad section having an internal peripheral groove, radially extending separator blocks detachably secured to said base ring between the ends of said arcuate sections, and a plurality of arcuate retainer band sections separate from said separator blocks detachably connected to the inner periphery of said base ring and each having an upwardly projecting portion forming an inner rim positioned against the inner periphery of the pad section portions which are of decreased width, each of said inner rim portions having an inwardly flanged tongue engaging the internal peripheral groove of a pad section to maintain the latter in assembled position.

2. In a thrust bearing, a base ring having an upstanding permanent external peripheral rim with an integral inwardly projecting circular tongue, at least three arcuate pad sections having a total circumferential length of somewhat less than 360 degrees to thereby provide an assembly gap, said pad sections being positioned on top of said base ring and each having an external peripheral groove which interlockingly receives the circular tongue of the base ring rim and each having an internal peripheral groove, radially extending separator blocks between the ends of said arcuate pad sections, means readily detachably connecting said blocks to the base ring, and a plurality of arcuate retainer band sections adjacent the inner periphery of said base ring and each having an upwardly projecting portion forming an inner rim detachably connected to said inner periphery, each inner rim portion having an integral inwardly projecting tongue engaging the internal peripheral groove of a pad section to maintain the latter in assembled position, said assembly gap being of such extent that when the separator blocks and retainer band sections are removed the pad sections may be moved inwardly a sufficient distance to disengage said external periphery groove of the pad sections from the circular tongue of the base ring rim.

3. In a thrust bearing, a base ring having an upstanding external peripheral rim with an integral inwardly projecting circular tongue, three arcuate pad sections having a total circumferential length of somewhat less than 360 degrees to provide an assembly gap, said pad sections being positioned on top of said base ring and each having an external peripheral groove which interlockingly receives the circular tongue of the base ring rim and each having an internal peripheral groove, separator means between ends of adjacent pad sections to substantially fill up said assembly gap, means readily detachably connecting said separator means to said base ring, and a plurality of arcuate retainer band sections detachably connected to the inner periphery of said base ring and each having an upwardly projecting portion separate from said separator means and forming an inner rim, each rim inner portion having an inwardly flanged tongue engaging the internal peripheral groove of a pad section to maintain the latter in assembled position, said assembly gap being of such extent that when the separator means and retainer band sections are removed the pad sections may be moved inwardly a sufficient distance to disengage said external peripheral grooves of the pad sections from the circular tongue of the base ring rim.

4. In a thrust bearing, a base ring having an upstanding permanent external peripheral rim with an inwardly projecting circular tongue, three arcuate pad sections having a total circumferential length of somewhat less than 360 degrees to thereby provide an assembly gap, said pad sections being positioned on top of said base ring and each having an external peripheral groove which interlockingly receives the circular tongue of the base ring rim and each having an internal peripheral groove, three radially extending separator blocks detachably secured to said base ring, each block being between adjacent ends of adjacent arcuate pad sections, and three retainer band sections separate from said separator blocks detachably connected to the inner periphery of said base ring and having upwardly projecting portions forming an inner rim, each rim portion having an inwardly flanged tongue engaging the internal peripheral groove of a pad section to maintain the latter in assembled position, said assembly gap being of such extent that when the separator blocks and retainer band sections are removed the pad sections may be moved inwardly a sufficient distance to disengage said external peripheral groove of the pad sections from the circular tongue of the base ring rim.

5. In a thrust bearing, a base ring having an upstanding external peripheral rim with an integral inwardly projecting circular tongue, at least three arcuate pad sections having a total circumferential length of somewhat less than 360 degrees to thereby provide an assembly gap, said pad sections being positioned on top of said base ring and each having an external peripheral groove which interlockingly receives the circular tongue of the base ring rim and each having an internal peripheral groove, separator means between the ends of said arcuate pad sections, means detachably connecting said separator means to the base ring, and a plurality of arcuate retainer band sections adjacent the inner periphery of said base ring and each having an upwardly projecting portion forming an inner rim detachably connected to said inner periphery, each inner rim portion having an integral inwardly projecting tongue, which tongues engage the internal peripheral groove of the pad sections to maintain the latter in assembled position, said assembly gap being of such extent that when the separator means and retainer band sections are removed the pad sections may be moved inwardly a sufficient distance to disengage said external peripheral groove of the pad sections from the circular tongue of the base ring rim.

References Cited in the file of this patent
UNITED STATES PATENTS
1,117,500    Kingsbury _____ Nov. 17, 1914